(12) United States Patent
Huang

(10) Patent No.: US 9,236,016 B2
(45) Date of Patent: Jan. 12, 2016

(54) TRANSPARENT DISPLAY DEVICE AND ELECTRONIC EQUIPMENT WITH SAME

(75) Inventor: Shunming Huang, Qingdao (CN)

(73) Assignee: HISENSE HIVIEW TECH CO., LTD., Qingdao, Shandong Province (CN)

(*) Notice: Subject to any disclaimer, the term of this patent is extended or adjusted under 35 U.S.C. 154(b) by 180 days.

(21) Appl. No.: 14/115,090

(22) PCT Filed: Jul. 19, 2012

(86) PCT No.: PCT/CN2012/078864
§ 371 (c)(1),
(2), (4) Date: Oct. 31, 2013

(87) PCT Pub. No.: WO2013/181878
PCT Pub. Date: Dec. 12, 2013

(65) Prior Publication Data
US 2014/0292839 A1 Oct. 2, 2014

(30) Foreign Application Priority Data
Jun. 4, 2012 (CN) .......................... 2012 1 0179970

(51) Int. Cl.
*G09G 3/36* (2006.01)
*G02F 1/1335* (2006.01)
*G09G 3/34* (2006.01)

(52) U.S. Cl.
CPC .......... *G09G 3/3607* (2013.01); *G02F 1/13362* (2013.01); *G02F 1/133514* (2013.01); *G02F 1/133528* (2013.01); *G02F 1/133533* (2013.01); *G09G 3/3413* (2013.01); *F25D 2400/36* (2013.01); *G02F 2001/133538* (2013.01); *G02F 2001/133614* (2013.01); *G02F 2201/52* (2013.01); *G02F 2203/68* (2013.01); *G09G 2300/0456* (2013.01)

(58) Field of Classification Search
CPC .............. G09G 3/3607; G09G 3/3413; G09G 2300/0456; G02F 1/133514; G02F 1/133528; G02F 1/133533; G02F 1/13362; G02F 2001/133538; G02F 2001/133614; G02F 2201/52; G02F 2203/68; F25D 2400/36
USPC ........................... 345/694; 349/41, 58, 69, 96
See application file for complete search history.

(56) References Cited

U.S. PATENT DOCUMENTS

2011/0128475 A1* 6/2011 Park .................. G02F 1/133514
349/96

* cited by examiner

*Primary Examiner* — Amare Mengistu
*Assistant Examiner* — Jennifer Zubajlo
(74) *Attorney, Agent, or Firm* — Cheng-Ju Chiang

(57) ABSTRACT

A transparent display device including a liquid crystal panel is provided. The liquid crystal panel includes a color filter substrate, an array substrate, a liquid crystal layer, a first polarizer and a second polarizer. The first polarizer is disposed on a side of the color filter substrate far from the liquid crystal layer. The second polarizer is disposed on a side of the array substrate far from the liquid crystal layer. The color filter substrate includes a transparent base, and a color filter formed on the transparent base. The color filter includes compound pixel regions, wherein each of the compound pixel regions has color sub-pixel regions and a transparent sub-pixel region. The second polarizer includes a non-polarized pattern spatially corresponding to the transparent sub-pixel region in the color filter, after a light passing through the non-polarized pattern, the polarization state remains unchanged.

13 Claims, 5 Drawing Sheets

TRANSPARENT DISPLAY DEVICE AND ELECTRONIC EQUIPMENT WITH SAME

CROSS REFERENCE TO RELATED APPLICATIONS

The present application claims priority from a Chinese patent application bearing an application number 201210179970.3, filed Jun. 4, 2012, all the contents of which are incorporated herein for reference. Besides, the present application is a 35 U.S.C. §371 National Phase conversion of International (PCT) Patent Application No. PCT/CN2012/078864, filed on Jul. 19, 2012, the disclosure of which is incorporated by reference herein. The PCT International Patent Application was filed in Chinese.

FIELD

The present invention relates to the field of display technology, and more particularly to a transparent display device and an electronic equipment with the transparent display device.

BACKGROUND

Transparent display technology is an emerging display technology. When a transparent display device display an image, objects disposed behind the transparent display device also can be seen through the device. That needs to enhance a transmittance of the transparent display device without losing its color gamut and contrast.

Meanwhile, the transparent display technology is a typical representative of the green display technology. For example, a conventional liquid crystal display needs a backlight module as a light source to display an image. The transparent display may use an ambient light to meet the need of the backlight. Especially in the daytime, the transparent display almost needs no backlight. The power consumption of the transparent display is about one-tenth of the ordinary liquid crystal display.

In order to improve the transmittance of the transparent display device, the original three primary colors of RGB color filter is usually reduced to 1/3 colors. However, by doing so, the color saturation of the image is also decreased.

Therefore, it needs to develop a transparent display device with high color saturation and high transmittance.

In order to increase the brightness of an image displayed by a transparent display device, an optical sheet can be placed under a light guide plate thereof, to reflect the light emitted from the light guide plate to the bottom and reflect it back to the light guide plate. The light guide plate includes a first refractive layer and a second refractive layer to allow a natural light transmits through the light guide plate. The first refractive layer is located adjacent to the liquid crystal panel. The second refractive layer has a higher refractive index than the first refractive layer. A first polarized light in the light guide plate is total reflected by a interface between the first refractive layer and the second refractive layer, and incident on the liquid crystal panel above the light guide plate, and a natural light transmits through the first and the second refraction layers incident on the liquid crystal panel, so that the user in front of the display device can see an object behind the light guide plate. However, the addition optical sheet and the special design of the light guide plate will increase the manufacturing cost of the display device.

SUMMARY

To solve the problems mentions above, the present invention provides a transparent display device and an electronic equipment having an improved transmittance.

To achieve above advantages, a transparent display device is provided in the present invention. The transparent display device includes a liquid crystal panel. The liquid crystal panel includes a color filter substrate, an array substrate, a liquid crystal layer, a first polarizer and a second polarizer. The first polarizer is disposed on a side of the color filter substrate far away from the liquid crystal layer. The second polarizer is disposed on a side of the array substrate far away from the liquid crystal layer. The color filter substrate includes a first transparent base, and a color filter formed on the first transparent base. The color filter includes a plurality of compound pixel regions, wherein each of the compound pixel regions has a plurality of color sub-pixel regions and a transparent sub-pixel region. The second polarizer includes a non-polarized pattern, the non-polarized pattern is spatially corresponding to the transparent sub-pixel region in the color filter, and after a light passing through the non-polarized pattern, the polarization state thereof remains unchanged.

An electronic equipment is provided in the present invention. The electronic equipment includes a transparent display device described above and a case including a bottom wall and a side wall, the bottom wall and the sidewall defining an opening in the case, wherein the liquid crystal panel in the transparent display device covers the opening.

Compared with the prior art, the liquid crystal panel of the present invention includes a color filter has a plurality of compound pixel regions, each of the compound pixel regions has a transparent sub-pixel region, and a second polarizer has a non-polarized pattern spatially corresponding to the transparent sub-pixel region in the color filter, so as to implement transparent display. In addition, the transmittance of the liquid crystal panel of the present invention can be improved by enhancing an occupied area ratio of the transparent sub-pixel region.

These and other features and advantages of the various embodiments disclosed herein will be better understood with respect to the following description and drawings.

DETAILED DESCRIPTION OF EMBODIMENTS

To further illustrate technical means adopted by the present invention for the purpose of the invention to achieve the intended purpose and the efficacy of the present invention, reference will now be made to the drawings to describe exemplary embodiments of a transparent display device and an electronic equipment with the transparent display device including specific structure, characteristics and effects thereof, as described in detail later.

The aforementioned and other technical contents, characteristics and efficacy of the present invention, reference to the following drawings in detailed description of the embodiment will be clearly presented. Through specific description of the embodiment, why the invention can be taken to achieve the intended purpose of the technical means and the effect can be more in-depth and detailed understanding. The following description is given by way of example, and not limitation.

Figure 1:
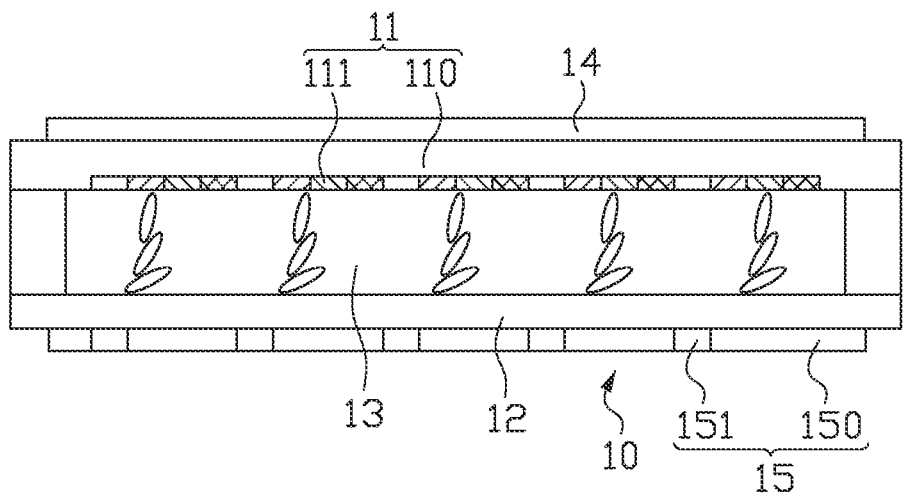
FIG. 1 is a cross-sectional view of a liquid crystal panel according to a first embodiment of the present invention.

FIG. 1 is a cross-sectional view of a transparent display device according to a first embodiment of the present invention. Referring to FIG. 1, the transparent display device according to the first embodiment includes a liquid crystal panel 10.

Specific, referring to FIG. 1, in the exemplary embodiment, the liquid crystal panel 10 includes a color filter substrate 11, an array substrate 12 opposite to the color filter substrate 11, a liquid crystal panel 13 sandwiched between the color filter substrate 11 and the array substrate 12, a first polarizer 14 and a second polarizer 15. The first polarizer 14 is disposed on a side of the first polarizer 14 far away from the liquid crystal layer 13. The second polarizer 15 is disposed on a side of the array substrate 12 far away from the liquid crystal layer 13. The color filter substrate 11 includes a first transparent base 110 and a color filter 111 formed on the first transparent base 110.

Figure 2:
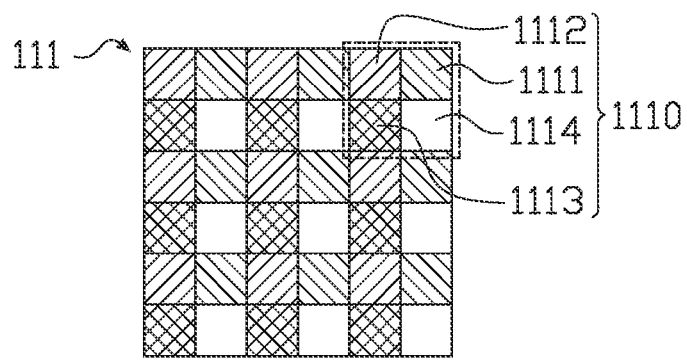
FIG. 2 is an exemplary arrangement of the color filter in FIG. 1.
Figure 3:
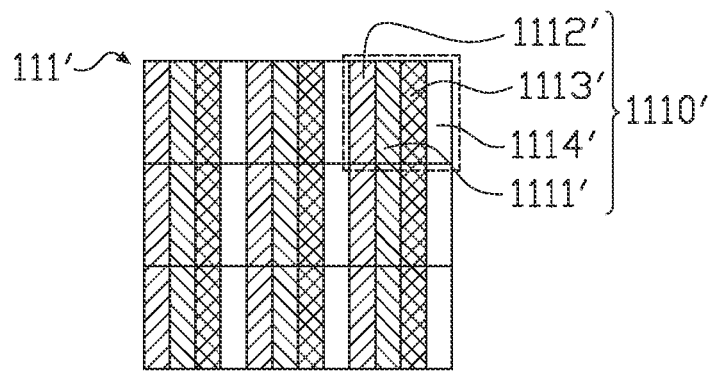
FIG. 3 is another exemplary arrangement of the color filter in FIG. 1.

FIG. 2 shows an exemplary arrangement of the color filter in the FIG. 1. Referring FIGS. 1 and 2, in one exemplary embodiment, the color filter 111 in the color filter substrate 11 includes a plurality of compound pixel regions 1110. Each of the compound pixel regions 1110 has a plurality of color sub-pixel regions and a transparent sub-pixel region 1114. Correspondingly, sub-pixels (not labeled) of the liquid crystal panel 10 include a plurality of color sub-pixels corresponding to the color sub-pixel regions and a transparent sub-pixel corresponding to a Transparent sub-pixel region 1114. The color sub-pixel regions can selectively passing different color light through by forming different color photoresist layers thereon. Preferably, in the exemplary embodiment, the plurality of color sub-pixel regions includes a red (R) sub-pixel region 1111, a green (G) sub-pixel region 1112 and a blue (B) sub-pixel region 1113. That is, a natural light passing through the R sub-pixel region 1111, the G sub-pixel region 1112 and the B sub-pixel region 1113 respectively turns to a red light, a green light and a blue light. Referring to FIG. 2, the R sub-pixel region 1111, the G sub-pixel region 1112, the B sub-pixel region 1113 and the transparent sub-pixel region 1114 may be arranged in a 2×2 pixel array. Referring to FIG. 3, the R sub-pixel region 1111', the G sub-pixel region 1112', the B sub-pixel region 1113' and the transparent sub-pixel region 1114' may be arranged in a 1×4 pixel array. It can be understood that, the number, the color and the arrangement for the color sub-pixel regions and the transparent sub-pixel region may be selected according to actual needs, and the present invention is not limited thereto. The transparent sub-pixel region 1114, 1114' can be formed by a transparent layer or opening a hole in the corresponding region thereof, but the present invention is not limited thereto.

Referring to FIG. 1 again, in the exemplary embodiment, the second polarizer 15 includes a polarized region 150 and a non-polarized region 151. The non-polarized region 151 constitutes a non-polarized pattern. The non-polarized pattern is spatially corresponding to the transparent sub-pixel region 1114 in the color filter 111. That is, a light passed through the non-polarized pattern in the second polarizer 15 can pass through the corresponding transparent sub-pixel region 1114 directly. And, the polarization state of the light passing through the non-polarized pattern remains unchanged. In other words, a natural light passing through the non-polarized pattern is still a natural light, and a linearly polarized light passing through the non-polarized pattern is still a linearly polarized light. Therefore, objects disposed behind the liquid crystal panel 10 are viewable through the first polarizer 14. In other words, a light reflected from objects disposed behind the second polarizer 15 transmits through the non-polarized pattern of the second polarizer 15, the array substrate 12, the liquid crystal layer 13, the transparent sub-pixel region 1114 of the color filter 111, and the first polarizer 14 sequentially. At the same time, the color sub-pixel corresponding to the color sub-pixel region (including the R sub-pixel region 1111, the G sub-pixel region 1112 and the B sub-pixel region 1113) display an image, such as a film or an advertising, for example. A transmittance of the transparent display device is about equal to 50%×(1/4)=12.5%. The transmittance of the liquid crystal panel can be improved by enhancing an occupied area ratio of the transparent sub-pixel region, which is the area of the transparent sub-pixel region/the area of (R+G+B+W) sub-pixel regions.

The non-polarized pattern can be formed by opening a hole in the second polarizer 15 or performing no polarization processing, but the present invention is not limited thereto.

In the exemplary embodiment, the liquid crystal panel can be used in the case of more adequate light background, and can be integrated with multi-touch and smart display technologies, as a public information display terminals. For example, the liquid crystal panel maybe used in computer monitors, display windows and other areas, with display, interactive, advertising and other synergies.

Figure 4:
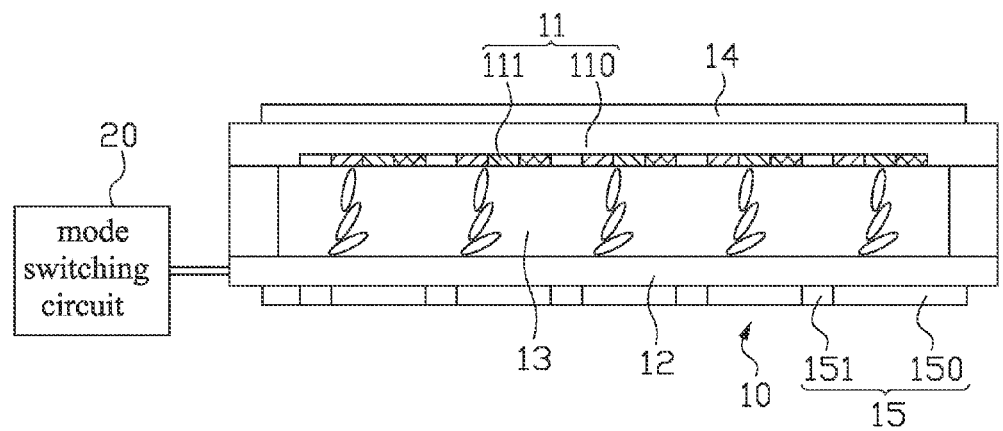
FIG. 4 is a cross-sectional view of a transparent display according to a second embodiment of the present invention.

FIG. 4 is a cross-sectional view of a transparent display device according to a second embodiment of the present invention. Referring to FIG. 4, the transparent display device includes a liquid crystal panel 10 and a mode switching circuit 20. The mode switching circuit 20 is electrically connected to the liquid crystal panel 10 to selectively activate the transparent display mode or the non-transparent display mode of the liquid crystal panel.

Figure 5:
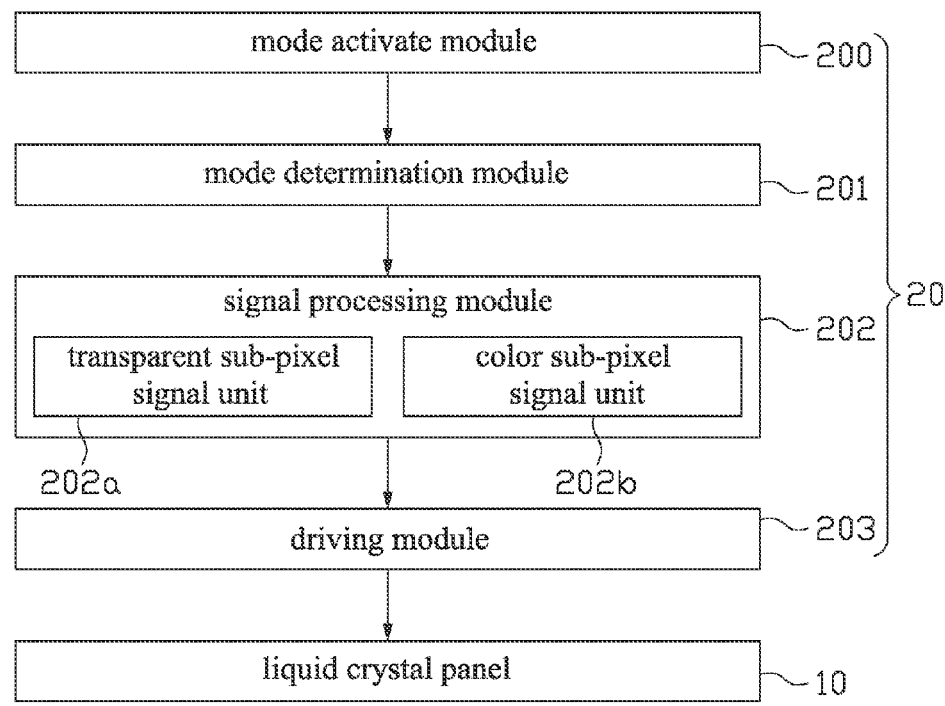
FIG. 5 is a schematic block of a transparent display according to a second embodiment of the present invention.

Referring to FIG. 5, the mode switching circuit 20 includes a mode activate module 200, a mode determination module 201, a signal processing module 202, and a driving module 203. The mode activate module 200 is configured to selectively activate the transparent display mode or the non-transparent display mode of the liquid crystal panel 10. The mode determination module 201 is configured to determine the mode selected by the mode activate module 200 is the transparent display mode or the non-transparent display mode. The signal processing module 202 includes a transparent sub-pixel signal unit 202a and a color sub-pixel signal unit 202b. When the determination result of the mode determination module 201 is the transparent display mode, the transparent sub-pixel signal unit 202a produces a control signal corresponding to the transparent sub-pixel set to be ON and transmits an image signal to the color sub-pixel signal unit 202b. When the determination result of the mode determination module is the non-transparent display mode, the transparent sub-pixel signal unit 202a produces a control signal corresponding to the transparent sub-pixel set to be OFF and transmits an image signal to the color sub-pixel signal unit 202b. The driving module 203 is configured to receive the control signal corresponding to the transparent sub-pixel and the image signal produced by the signal processing module 202 and produces a driving voltage signal for the liquid crystal panel 10.

Figure 6:
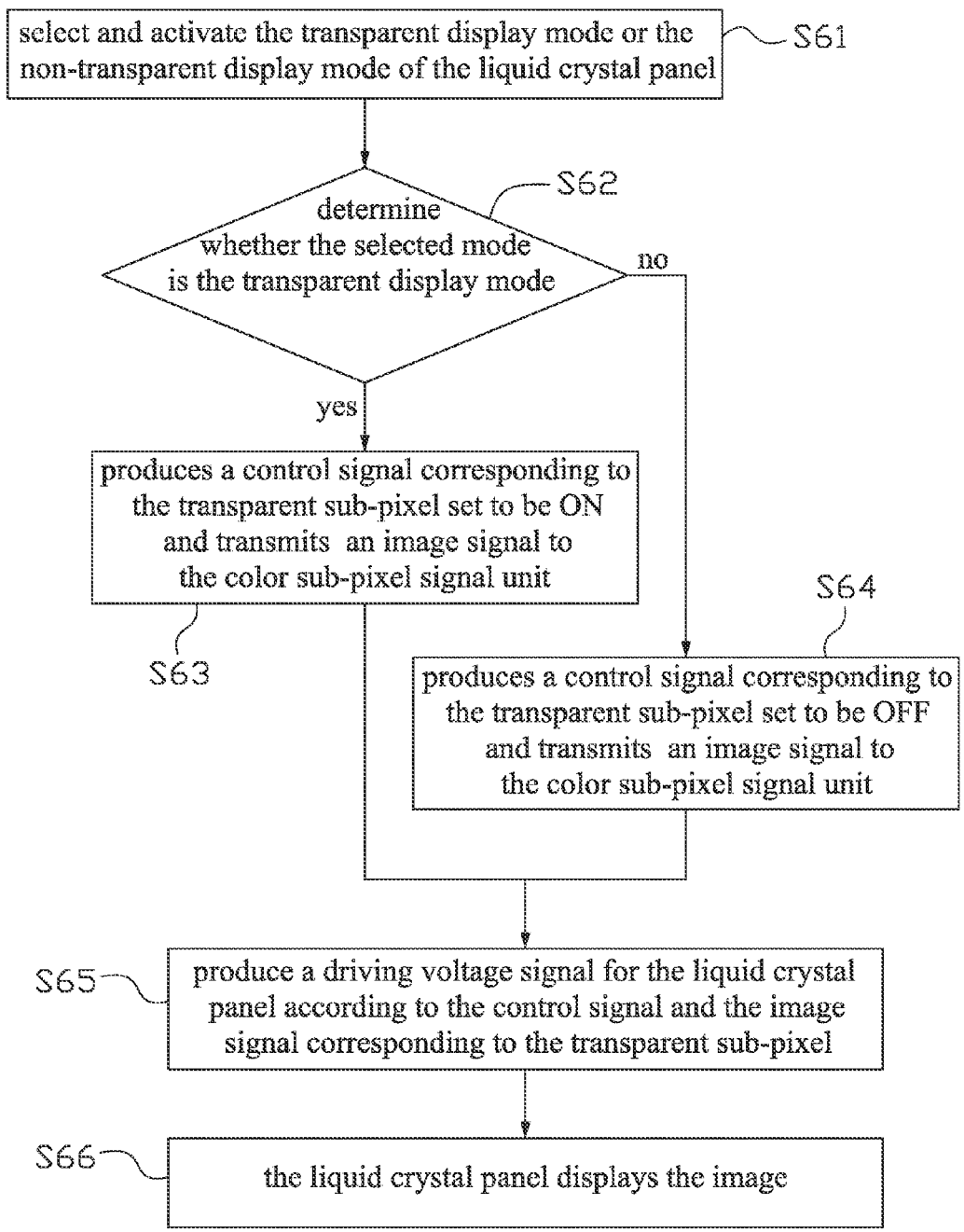
FIG. 6 is a flow chart of a control process of a transparent display according to a second embodiment of the present invention.

Referring to FIG. 6, first, in Step S61, the mode switching circuit 20 is triggered from the external. The mode activate module 200 selects and activates the transparent display mode or the non-transparent display mode. Transparent display mode means, through the liquid crystal panel 10, both the objects disposed behind the liquid crystal panel 10 and the image displayed thereon can be seen. Non transparent display mode means, through the liquid crystal panel 10, the image displayed on the liquid crystal panel 10 can be seen, but the objects disposed behind the liquid crystal panel 10 cannot be seen. In Step 62, whether the selected mode is the transparent display mode is determined. If the determination result is that the selected mode is the transparent display mode, turning to Step S63. In Step S63, the transparent sub-pixel signal unit 202a produces a control signal corresponding to the transparent sub-pixel set to be ON and transmits an image signal to the color sub-pixel signal unit 202b. If the determination result is that the selected mode is the non-transparent display mode, turning to Step S64. In Step S64, the transparent sub-pixel signal unit 202a produces a control signal corresponding to the transparent sub-pixel set to be OFF and transmits an image signal to the color sub-pixel signal unit 202b. In Step S65, the driving module 203 produces a driving voltage signal for the liquid crystal panel 10 according to the control signal corresponding to the transparent sub-pixel and the image signal. In Step S66, the liquid crystal panel displays an image according to the driving voltage signal. When the transparent sub-pixel is switched off, i.e., the non-transparent display mode is selected, the objects disposed behind the liquid crystal panel 10 is not viewable from the front side thereof. When the transparent sub-pixel is switched on, i.e., the transparent display mode is selected, the objects disposed behind the liquid crystal panel 10 is viewable from the front side thereof.

The transparent display device of the present invention can be switched between the transparent display mode and the non-transparent display mode. Correspondingly, the transparent display device can be either a transparent display device or a regular display device.

Figure 7:
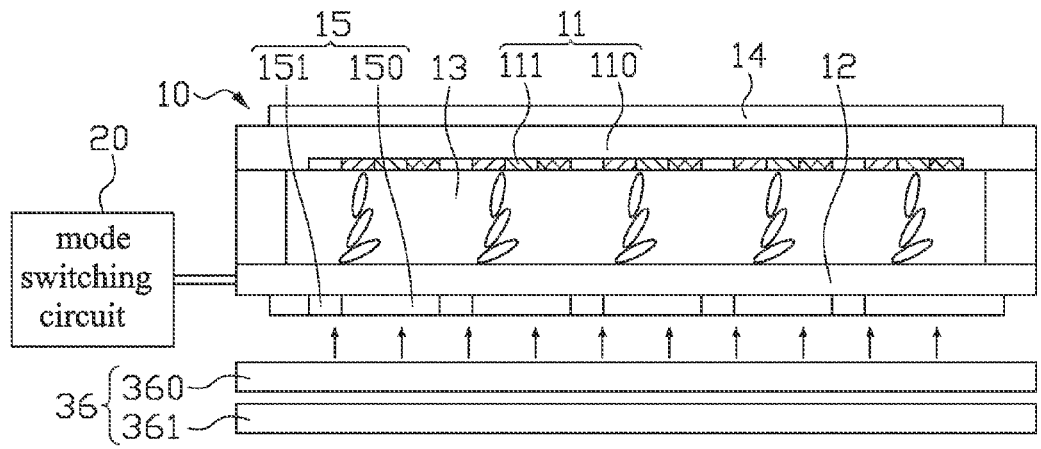
FIG. 7 is a cross-sectional view of a transparent display according to a third embodiment of the present invention, in which the polarized light source facing towards the second polarizer.
Figure 8:
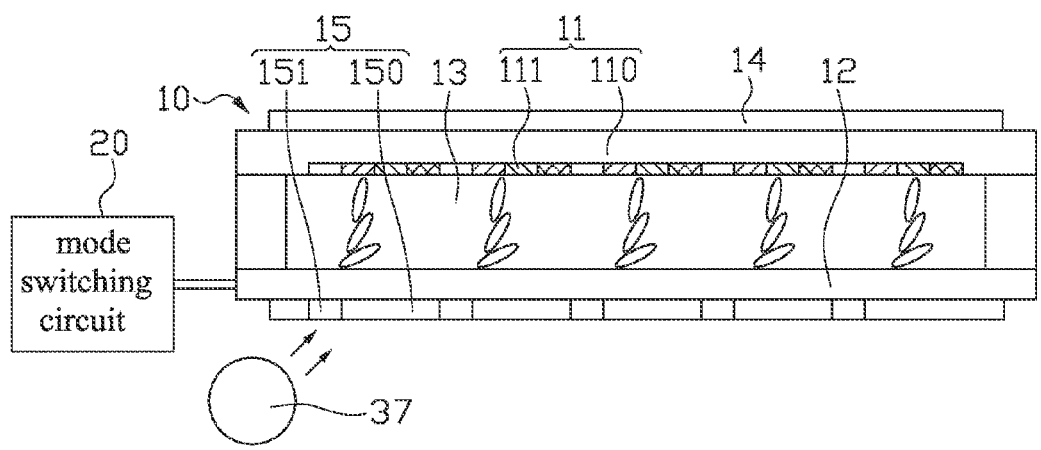
FIG. 8 is another cross-sectional view of a transparent display according to a third embodiment of the present invention, in which the polarized light source disposed on the periphery of the liquid crystal panel.

FIG. 7 is a cross-sectional view of a transparent display device according to a third embodiment of the present invention. Referring to FIG. 7, the difference between the transparent display device in the third embodiment and the transparent display device in the second embodiment is that the transparent display device in the third embodiment further includes a polarized light source 36. The position of the polarized light source 36 is shown in FIG. 7, in the exemplary embodiment, the polarized light source 36 is located or positioned facing toward the second polarizer 15. In other words, the polarized light source 36 is located or positioned right behind the liquid crystal panel 10. Referring to FIG. 8, in alternative embodiments, the polarized light source 37 is located or positioned on a periphery of the liquid crystal panel 10. In other words, the polarized light source 37 is located or positioned on a side of the rear of the liquid crystal panel 10. Preferable, the polarization direction of the polarized light source 36 or 37 is set to be parallel to a polarization direction the second polarizer 15, to improve the display.

Referring to FIG. 7, in the exemplary embodiment, the polarized light source 36 may include a third polarizer 360 and a natural light emitting element 361. A natural light emitted from the natural light emitting element 361 transmits through the third polarizer 360 and is incident on the second polarizer 15. The natural light emitting element 361 may be a light-emitting diode, or a cold cathode fluorescent tube, for example.

Figure 9:
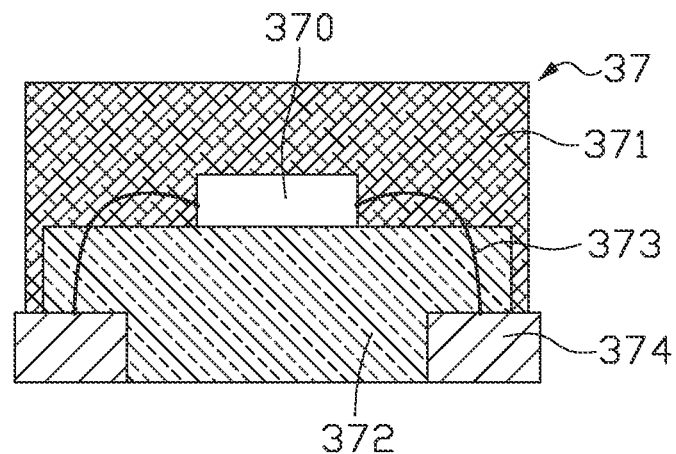
FIG. 9 is a cross-sectional view of the polarized light source in FIG. 8.

Of course, the polarized light source itself may be a polarized light emitting element. For example, referring to FIG. 9, the polarized light source 37 can be a light-emitting diode type polarized light emitting element. The polarized light source 37 includes a light-emitting diode chip 370 and a package 371 containing a polarizing material. The light-emitting diode chip 370 is disposed on a substrate 372 and electrically connected with the electrode 374 via a wire 373. The package 371 is packaged on a light emitting side of the light-emitting diode chip 370. A light emitted from the light-emitting diode chip 370 transmits through the package 371 and is incident on the second polarizer, and after being transmitted through the third polarizer, a polarization direction of the light is parallel to a polarization direction of the second polarizer. The structure of the polarized light source 36, 37 is not limited to the above description, as long as the polarization direction thereof parallel to the polarization direction of the second polarizer 15.

Figure 10:
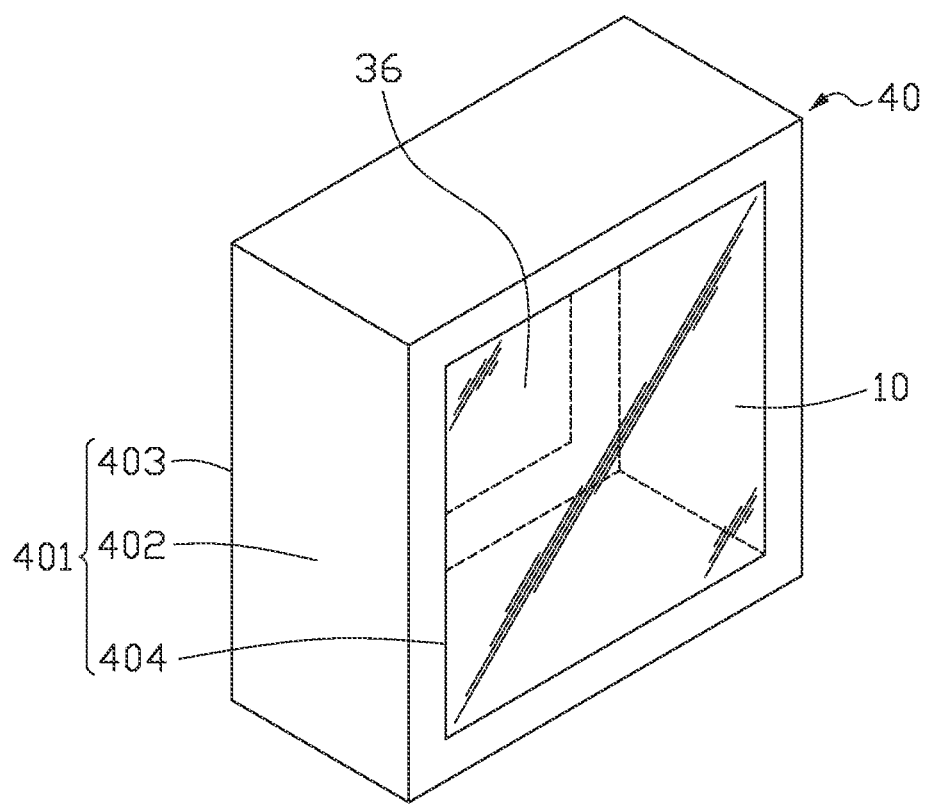
FIG. 10 is a cross-sectional view of an electronic equipment according to a fourth embodiment of the present invention.

FIG. 10 is a cross-sectional view of an electronic equipment according to a fourth embodiment of the present invention. Referring to FIG. 10, the electronic equipment 40 includes a case 401 and a transparent display device disposed on the case 401. The transparent display device can be the transparent display device in the embodiments of the present invention. The electronic equipment 40 includes a case 401 having a bottom wall 403 and a sidewall 402. The bottom wall 403 and a sidewall 402 define an opening 404. The liquid crystal panel 10 in the transparent display device covers the opening 404. The electronic equipment 40 further includes a polarized light source, disposed on the bottom wall or the sidewall of the case 401. Preferably, a polarization direction of the polarized light source is parallel to a polarization direction of the second polarizer. The electronic equipment may be a showcase, a refrigerator or a vending machine.

In summary, compared with the prior art, the liquid crystal panel of the present invention includes a color filter has a plurality of compound pixel regions, each of the compound pixel regions has a transparent sub-pixel region, and a second polarizer has a non-polarized pattern spatially corresponding to the transparent sub-pixel region in the color filter, so as to implement transparent display. In addition, the transmittance of the liquid crystal panel of the present invention can be improved by enhancing an occupied area ratio of the transparent sub-pixel region. The liquid crystal panel of the present invention can be used in the case of more adequate light background, and can be integrated with multi-touch and smart display technologies, as a public information display terminals. For example, the liquid crystal panel maybe used in computer monitors, display windows and other areas, with display, interactive, advertising and other synergies.

The above description is given by way of example, and not limitation. Given the above disclosure, one skilled in the art could devise variations that are within the scope and spirit of the present invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A transparent display device, comprising:
   a liquid crystal panel, comprising:
      a first substrate, comprising:
         a first transparent base;
         a color filter disposed on the first transparent base, comprising:
            a plurality of compound pixel regions, wherein each of the compound pixel regions has a plurality of color sub-pixel regions and a transparent sub-pixel region;
      a second substrate opposite to the first substrate;
      a liquid crystal layer, sandwiched between the first substrate and the second substrate;
      a first polarizer, disposed on a side of the first substrate far away from the liquid crystal layer;
      a second polarizer, disposed on a side of the second substrate far away from the liquid crystal layer, wherein the second polarizer comprises a non-polarized pattern, the non-polarized pattern is spatially corresponding to the transparent sub-pixel region in the color filter, and after a light passing through the non-polarized pattern, the polarization state thereof remains unchanged; and
      a polarized light source, wherein a polarization direction of the polarized light source is parallel to a polarization direction of the second polarizer.

2. The transparent display device as claimed in claim 1, wherein the plurality of color sub-pixel regions comprises a red sub-pixel region, a green sub-pixel region, and a blue sub-pixel region.

3. The transparent display device as claimed in claim 2, wherein the red sub-pixel region, the green sub-pixel region, the blue sub-pixel region, and the transparent sub-pixel region are arranged in a 2×2 pixel array.

4. The transparent display device as claimed in claim 2, wherein the red sub-pixel region, the green sub-pixel region, the blue sub-pixel region, and the transparent sub-pixel region are arranged in a 1×4 pixel array.

5. The transparent display device as claimed in claim 1, further comprising: a mode switching circuit electrically connected to the liquid crystal panel, configured to switch on or off transparent sub-pixels corresponding to the transparent sub-pixel regions in the color filter, so as to implement switch between a transparent display mode and a non-transparent display mode.

6. The transparent display device as claimed in claim 5, wherein the mode switching circuit comprising:
   a mode activate module, configured to selectively activate the transparent display mode or the non-transparent display mode of the liquid crystal panel;
   a mode determination module, configured to determine the mode selected by the mode activate module is the transparent display mode or the non-transparent display mode;
   a signal processing module, comprising a transparent sub-pixel signal unit and a color sub-pixel signal unit, wherein when the determination result of the mode determination module is the transparent display mode, the transparent sub-pixel signal unit produces a control signal corresponding to the transparent sub-pixel set to be ON and transmits an image signal to the color sub-pixel signal unit; when the determination result of the mode determination module is the non-transparent display mode, the transparent sub-pixel signal unit produces a control signal corresponding to the transparent sub-pixel set to be OFF and transmits an image signal to the color sub-pixel signal unit; and
   a driving module, configured to receive the control signal corresponding to the transparent sub-pixel and the image signal produced by the signal processing module and produces a driving voltage signal for the liquid crystal panel.

7. The transparent display device as claimed in claim 1, wherein the polarized light source is disposed facing toward the second polarizer.

8. The transparent display device as claimed in claim 1, wherein the polarized light source is disposed on a periphery of the liquid crystal panel.

9. The transparent display device as claimed in claim 1, wherein the polarized light source comprises a natural light emitting element and a third polarizer, a natural light emitted from the natural light emitting element transmits through the third polarizer and is incident on the second polarizer, and after being transmitted through the third polarizer, a polarization direction of the natural light is parallel to a polarization direction of the second polarizer.

10. The transparent display device as claimed in claim 1, wherein the polarized light source comprises a light-emitting diode chip and a package containing a polarizing material, a light emitted from the light-emitting diode chip transmits through the package and is incident on the second polarizer, and after being transmitted through the third polarizer, a polarization direction of the light is parallel to a polarization direction of the second polarizer.

11. An electronic equipment, comprising:
   a transparent display device as claimed in claim 1; and
   a case comprising a bottom wall and a sidewall, the bottom wall and the sidewall defining an opening in the case, wherein the liquid crystal panel in the transparent display device covers the opening.

12. The electronic equipment as claimed in claim 11, further comprising:
   a polarized light source, disposed on the bottom wall or the sidewall of the case, wherein a polarization direction of the polarized light source is parallel to a polarization direction of the second polarizer.

13. The electronic equipment as claimed in claim 11, wherein the electronic equipment is a showcase, a refrigerator or a vending machine.

* * * * *